United States Patent
Hwang

(10) Patent No.: US 9,438,119 B1
(45) Date of Patent: Sep. 6, 2016

(54) SWITCHING POWER SUPPLY HAVING LOADING CONDITION REMEMBRANCE AND IMPROVED HOLD-UP TIME CHARACTERISTICS

(75) Inventor: Jeffrey Hwang, Saratoga, CA (US)

(73) Assignee: Champion Microelectronic Corporation, Hsinchu (TW)

( * ) Notice: Subject to any disclaimer, the term of this patent is extended or adjusted under 35 U.S.C. 154(b) by 1967 days.

(21) Appl. No.: 12/549,222

(22) Filed: Aug. 27, 2009

(51) Int. Cl.
*H02M 3/335* (2006.01)

(52) U.S. Cl.
CPC .......... *H02M 3/335* (2013.01); *Y02B 70/1433* (2013.01); *Y02B 70/1441* (2013.01)

(58) Field of Classification Search
CPC .............. H02M 3/33507; H02M 3/33523; H02M 3/335; Y02B 70/1433; Y02B 70/1441; Y02B 70/4815
USPC .......... 323/222, 266, 271, 282–285; 363/16, 363/21.01, 21.02, 95, 97, 131
See application file for complete search history.

(56) References Cited

U.S. PATENT DOCUMENTS

| | | | |
|---|---|---|---|
| 5,565,761 A | 10/1996 | Hwang | |
| 5,903,138 A | 5/1999 | Hwang et al. | |
| 6,452,366 B1 | 9/2002 | Hwang | |
| 6,531,854 B2 | 3/2003 | Hwang | |
| 6,570,493 B1 * | 5/2003 | Rotem | 340/12.33 |
| 6,657,417 B1 | 12/2003 | Hwang | |
| 7,888,926 B2 * | 2/2011 | Ishino | 323/284 |
| 8,184,456 B1 * | 5/2012 | Jain et al. | 363/21.02 |
| 2004/0174152 A1 | 9/2004 | Hwang et al. | |
| 2009/0034298 A1 | 2/2009 | Liu et al. | |
| 2009/0290387 A1 * | 11/2009 | Wheeler et al. | 363/21.01 |

OTHER PUBLICATIONS

Hwang et al., U.S. Appl. No. 12/290,853, entitled, "Resonant Switching Converter Having Operating Modes Above and Below Resonant Frequency," filed Nov. 4, 2008.
CM6502S (Dynamic Soft PFC), data sheet, Rev. 1.0, Champion Microelectronic Corporation, dated Jul. 29, 2008.

* cited by examiner

*Primary Examiner* — Yemane Mehari
(74) *Attorney, Agent, or Firm* — Westberg Law Offices

(57) ABSTRACT

A switching power supply comprises one or more power supply stages that receive power from an input power source and that generate a regulated output voltage for powering a load by alternately opening and closing a set of switches. Controller circuitry monitors the input power source for loss of power as well as a state of the load. When loss of power is detected, the controller circuitry saves a state of the load.

27 Claims, 7 Drawing Sheets

US 9,438,119 B1

SWITCHING POWER SUPPLY HAVING LOADING CONDITION REMEMBRANCE AND IMPROVED HOLD-UP TIME CHARACTERISTICS

FIELD OF THE INVENTION

The present invention relates to the field of power supplies. More particularly, the present invention relates to the field of switching power supplies.

BACKGROUND OF THE INVENTION

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

An exemplary DC-to-DC converter includes a series resonant circuit (SRC) topology. In this configuration, an inductor and a capacitor are connected in series to form a resonant tank. A switching inverter charges the resonant tank with energy. A load receives power from the resonant tank. Adjusting the switching frequency of the inverter changes the impedance of the resonant tank, and because the resonant tank is in series with the load, this changes the power delivered to the load. The switching frequency can be adjusted to maintain the DC output voltage constant.

It is desired to provide an improved off-line power supply.

SUMMARY OF THE INVENTION

The present invention is directed toward a switching power supply. The switching power supply comprises one or more power supply stages that receive power from an input power source and that generate a regulated output voltage for powering a load by alternately opening and closing a set of switches. Controller circuitry monitors the input power source for loss of power as well as a state of the load. When loss of power is detected, the controller circuitry saves a state of the load.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
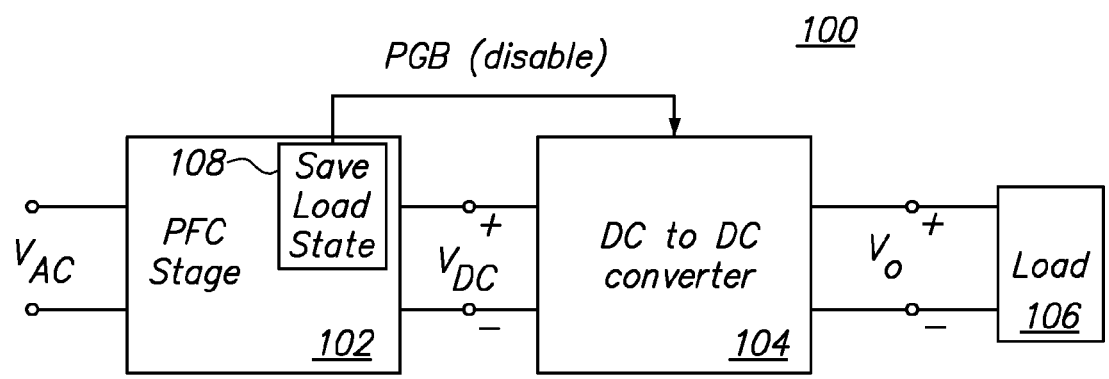
FIG. 1 illustrates a block schematic diagram of a two-stage, off-line power supply in accordance with an embodiment of the present invention.

A two-stage, off-line switching power supply receives power from an AC source (the AC source is also referred to as "line voltage"). The power supply includes a power factor correction (PFC) stage and a DC-to-DC converter stage. The PFC stage controls its switching so that input current is maintained substantially in-phase with the line voltage. This causes the supply to appear as a resistive load to the AC source.

The DC-to-DC converter stage may include a resonant tank circuit. In this case, the gain of the resonant tank circuit can be controlled by adjusting the switching frequency. Particularly, the frequency is reduced to increase the gain and, conversely, the switching frequency is increased to reduce the gain. The switching frequency is adjusted in a feedback loop to regulate the output voltage. As the switching frequency drops below a certain frequency, however, the gain drops off. This "drop-off" frequency is lower at heavier loads than at lighter loads. It is desired to avoid operation below this "drop-off" frequency. This means that at lighter loads, the switching frequency can go lower than at heavier loads before the "drop-off" frequency is reached.

Hold-up time is the time during which the output of the power supply is regulated after the line voltage is lost, such as during a power outage. When the line voltage is lost, it is generally desired to maintain the regulated output voltage for a predictable time period and for a time that is sufficiently long that a powered load can power down in an orderly fashion. However, because the power supply, and particularly the DC-to-DC converter stage, behaves differently depending upon loading, it is advantageous to determine whether the switching power supply was operating under light or heavy loading conditions at the time that the line voltage is lost. This allows the switching in the DC-to-DC converter to be halted at different times or under different conditions, depending upon the loading that was present at the time the line voltage was lost. For example, when the power supply is under light load conditions, the disabling of the switching in the DC-to-DC converter can be delayed in comparison to heavy loading conditions. This allows the switching to continue longer so that the hold-up time can be extended under light load conditions. Alternatively, the disabling of the switching can be performed based on different conditions depending on the loading, which conditions are expected to result in the hold-up being approximately the same for both light and heavy loads.

Light loading refers to a condition under which the load is drawing a relatively a low level of power. For example, the load may be in a powered-on, standby condition. In contrast, heavy loading refers to a condition where the load is drawing a relatively high power level. For example, the load may be drawing power at or near the maximum power delivering capacity of the power supply.

The input current can be monitored to determine when the line voltage is lost. When the input current falls below a predetermined level, this indicates that the line voltage is lost. In addition, the state of the load can be monitored. For example, whether the power supply was operating under light or heavy loading can be monitored. In response to the loss of the line voltage, information that is representative of the loading condition is saved. In other words, the loading condition just prior to the power loss is saved (or "remembered"). The saved information can then be used in the generation of a signal that disables switching in the DC-to-DC converter.

FIG. 1 illustrates a block schematic diagram of a two-stage, off-line power supply 100 in accordance with an embodiment of the present invention. As shown in FIG. 1, a power factor correction (PFC) stage 102 has an input coupled to an AC source. The PFC stage 102 performs rectification on the AC input signal and maintains current drawn from the AC source substantially in phase with the line voltage so that the power supply 100 appears as a resistive load to the AC source.

The PFC stage 102 generates an intermediate voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load 106. The level of $V_{DC}$ is preferably at a higher voltage and is more loosely regulated than the output $V_O$ of the DC-to-DC converter stage 104. A nominal level for the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Due to various causes, the AC source or "line voltage," may be lost. For example, a power outage, supply interruption or simply unplugging of the power supply 100 can result in a loss of the AC source as seen by the power supply 100. As mentioned above, it is desired to save the state of the load 106 at the time the line voltage is lost. As shown in FIG. 1, the state of the load 106 (i.e. its loading condition) may be saved by a Save Load State circuit 108. The PFC stage 102 monitors the state of the load 106. For example, this can be accomplished by the PFC stage 102 monitoring the effect that the DC-to-DC converter 104 has on the level of $V_{DC}$. Particularly, when the load 106 is heavy (drawing more power), this tends to cause the DC-to-DC converter 104 to pull the level of $V_{DC}$ down, whereas, this effect is lessened when the load 106 is light (drawing less power). Therefore, by monitoring for changes in the level of $V_{DC}$, the state of the load can be determined as "light" or "heavy." While two possibilities are disclosed, additional levels of loading can be determined (e.g. light, medium-light, medium, medium-heavy, heavy, etc.).

When the line voltage is lost, the state of the load 106 is then saved by the Save Load State circuit 108. The saved state of the load can then be used to control the sending of a signal (referred to as a power gating signal, labeled "PGB" in FIG. 1) that causes switching in the DC-to-DC converter 104 to cease. Thus, the power gating signal, PGB, can be sent at different times, or under different circumstances, depending upon the state of the load when the AC line voltage was lost.

In an embodiment, the level at which $V_{DC}$ is regulated by the PFC stage 102 can be different depending upon the loading. For example, under heavy loading, the level can be regulated at 380 volts DC, as described above. However, under light loading, the level can be regulated at a reduced level, for example, 342 volts DC. Employing a lower voltage level for light loads tends to increase efficiency of the power supply 100. However, this lower voltage level will tend to affect the hold-up time after the AC source is lost. Therefore, as explained above, the state of the load can be saved and used to control the sending of the power gating signal PGB that causes switching in the DC-to-DC converter 104 to cease after the AC source is lost.

Figure 2:
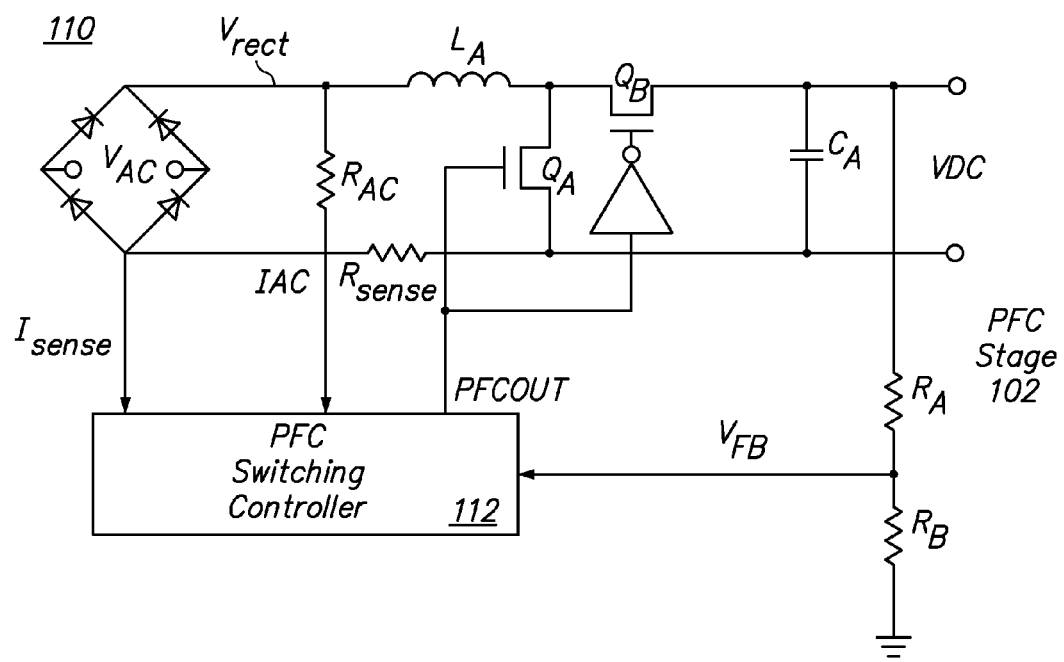
FIG. 2 illustrates a schematic diagram of a power factor correction circuit in accordance with an embodiment of the present invention.

FIG. 2 illustrates a schematic diagram of a power factor correction circuit 102 in accordance with an embodiment of the present invention. An alternating-current (AC) input source is coupled across input terminals of a bridge rectifier 110. A rectified input voltage signal Vrect is formed at a first output terminal of the rectifier 110 and is coupled to a first terminal of an inductor $L_A$ and to a first terminal of a resistor $R_{AC}$. A second terminal of the inductor $L_A$ is coupled to a first terminal of a transistor switch $Q_A$ and to a first terminal of a transistor switch $Q_B$. A second terminal of the switch $Q_B$ is coupled to a first terminal of an output capacitor $C_A$. A second terminal of the switch $Q_A$ and a second terminal of the capacitor $C_A$ are coupled to a ground node.

A second terminal of the resistor $R_{AC}$ is coupled to a voltage sensing input of a PFC switching controller 112. A voltage sensing current signal $I_{AC}$ which is representative of the rectified input voltage Vrect flows through the resistor $R_{AC}$ and is received by the controller 112. A second output terminal of the bridge rectifier 110 is coupled to a current sensing input of the controller 112 and to a first terminal of a resistor Rsense. A second terminal of the resistor Rsense is coupled to the ground node. A signal Isense that is representative of the current input to the power factor correction circuit 102 is received by the controller 112.

A output voltage sensing signal $V_{FB}$ is formed by a resistor $R_A$ having a first terminal coupled to the output voltage $V_{DC}$ and a second terminal coupled to a first terminal of resistor $R_B$. A second terminal of the resistor $R_B$ may be coupled a ground node. The resistors $R_A$ and $R_B$ form a voltage divider in which the signal $V_{FB}$ is formed at the node between the resistors $R_A$ and $R_B$. The signal $V_{FB}$ is representative of the output voltage $V_{DC}$.

The PFC switching controller 112 generates a signal $PFC_{OUT}$ which controls the opening and closing of the switches $Q_A$ and $Q_B$ so as to regulate the intermediate output voltage $V_{DC}$ while maintaining the input current in phase with the input voltage $V_{AC}$. To accomplish this, the controller 112 uses the signal $V_{FB}$, as well as the input current and voltage sensing signals $I_{AC}$ and Isense. The switches $Q_A$ and $Q_B$ are operated such that when one is opened, the other is closed.

Figure 3:
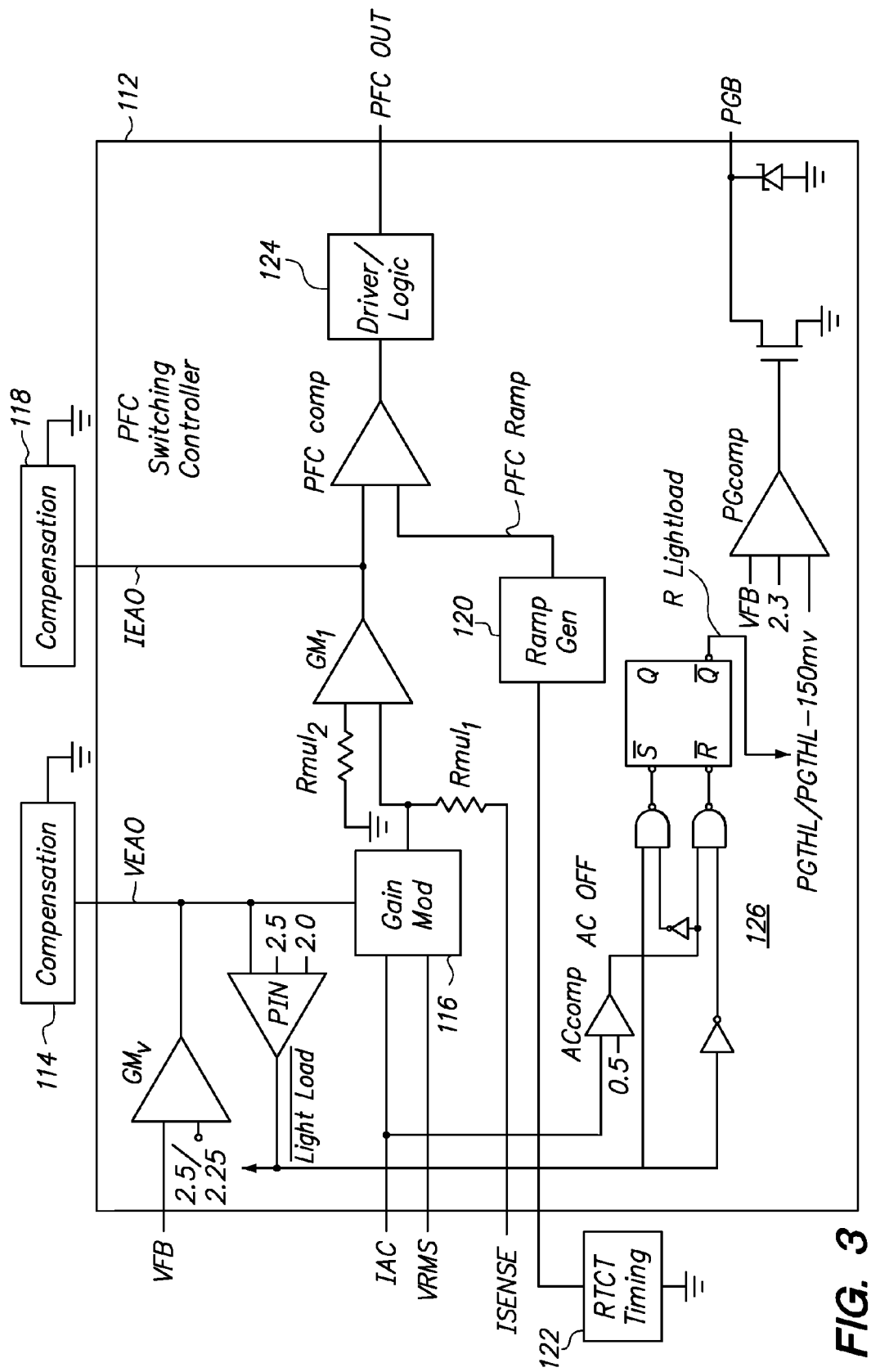
FIG. 3 illustrates a block schematic diagram of a controller for a power factor correction circuit in accordance with an embodiment of the present invention.

FIG. 3 illustrates a block schematic diagram of the PFC switching controller 112 in more detail in accordance with an embodiment of the present invention. Within the controller 112, the signal $V_{FB}$ is coupled to a first input terminal of a transconductance error amplifier GMv. A second input of the error amplifier GMv is coupled to a reference voltage that is representative of a desired level for the output voltage $V_{DC}$. This reference voltage may be 2.25 volts or 2.5 volts, depending upon the output level of a comparator PIN. An output of the error amplifier GMv forms a signal $V_{EAO}$, which is an error signal that is representative of a difference between the actual level of the output voltage $V_{DC}$ and a desired level for the output voltage. As shown in FIG. 3, the error signal $V_{EAO}$ is formed across a compensation circuit 114.

The comparator PIN determines whether the PFC circuit 102 is operating under light load conditions or heavy loading conditions (i.e. loading conditions other than light load) according to the level of the error signal $V_{EAO}$. When the level of the error signal $V_{EAO}$ is less than 2.0 volts, this indicates light load conditions; in this case, the output of the comparator PIN is a logic low voltage. If the level of the error signal $V_{EAO}$ then exceeds 2.5 volts, this indicates heavy loading conditions; in this case, the output of the comparator PIN changes to a logic high voltage. If level of the error signal $V_{EAO}$ then falls below 2.0 volts, this again indicates light load conditions; in this case, the output of the comparator PIN changes back to a logic low voltage. Thus, the comparator PIN preferably operates with hysteresis to inhibit its output from transitioning under slight changes in loading. The output of the comparator PIN is a signal labeled "Heavy Load." In this way, the state of the load can be determined by monitoring for changes in the level of $V_{DC}$. More particularly, the state of the load can be determined by monitoring the error signal $V_{EAO}$.

When the output of the comparator PIN is a logic high voltage (heavy loading), the reference voltage coupled to the error amplifier GMv is 2.5 volts, which causes the output voltage $V_{DC}$ to be regulated at approximately 380 volts DC. When the output of the comparator PIN is a logic low voltage (light loading), the reference voltage coupled to the error amplifier GMv is preferably 2.25 volts, which causes the output voltage $V_{DC}$ to be regulated at approximately 342 volts DC. Thus, the level at which $V_{DC}$ is regulated by the PFC stage 102 can be different depending upon the loading.

A gain modulation block 116 receives the error signal $V_{EAO}$, as well as the signal $I_{AC}$ and a signal $V_{RMS}$ for generating a modulated error signal Imul. The signals $V_{EAO}$ and $I_{AC}$ are described above. The signal $V_{RMS}$ is representative of the level of the AC line voltage and is used to inhibit switching in the PFC stage 102, by gradually pulling down the level of the error signal $V_{EAO}$, if the AC line voltage is too low for an extended period (i.e. under "brown out" conditions).

The output of the gain modulation block 116 is coupled to a first input terminal of a transconductance amplifier GMi and to a first terminal of a resistor $Rmul_1$. A second terminal of the resistor $Rmul_1$ is coupled to receive the signal Isense. A first terminal of a resistor $Rmul_2$ is coupled to a second input terminal of the amplifier GMi. A second terminal of a resistor $Rmul_2$ is coupled to a ground node.

An output of the amplifier GMi is coupled to a compensation circuit 118. A signal IEAO is formed at the output of the amplifier GMi. The signal IEAO is representative of the error signal $V_{EAO}$ as well as the input voltage and current to the PFC stage. The signal IEAO is coupled to a first input of the comparator PFCcomp. An output of a ramp generator 120 forms a ramp signal PFC ramp which is coupled to a second terminal of the comparator PFCcomp. An RTCT node of the ramp generator 120 is coupled to an RTCT timing network 122 which sets the frequency of the ramp signal.

An output of the comparator PFCcomp is coupled to driver/logic block 124 which includes driver and logic circuit elements for forming the PFC switching signal $PFC_{OUT}$. It will be apparent that the PFC function and control of switching in the PFC stage 102 can be accomplished in other ways and by employing different circuit arrangements.

The signal $I_{AC}$ is coupled to a first input of a comparator ACcomp while a reference voltage of 0.5 volts is coupled a second input of the comparator ACcomp. The comparator ACcomp generates a signal $AC_{OFF}$ at its output, which indicates whether the input voltage has fallen below a minimum threshold. Logic 126 combines the signal $AC_{OFF}$ with the signal $\overline{LightLoad}$ at the output of the comparator PIN to form a signal R Light Load ("Remember Light Load"). The signal R Light Load is a logic signal that indicates the state of the signal $\overline{LightLoad}$ when the signal $I_{AC}$ is above its minimum threshold and saves its state whenever the signal $I_{AC}$ falls below its minimum threshold as detected by the comparator ACcomp. In other words, the logic 126 remembers (by holding the state of the signal R Light Load) whether power converter 100 was under light or heavy loading conditions at the time that the AC input signal is lost.

The signal R Light Load is used to adjust the level of a threshold voltage applied to a power gate comparator PGcomp. More particularly, a first input of the comparator PGcomp is coupled to receive the feedback signal $V_{FB}$. A second input of the comparator PGcomp is coupled to receive a first reference voltage of 2.3 volts and a third input is coupled to receive a second reference voltage. The level of the second reference voltage changes dependent upon the level of the signal R Light Load. More particularly, a reference voltage PGTHL is coupled to the third input of the comparator when R Light Load indicates that the power converter 100 was under heavy loading conditions at the time that the AC input signal is lost; and, a reference voltage PGTHL—150 mV is coupled to the third input of the comparator when R Light Load indicates that the power converter 100 was under light loading conditions at the time that the AC input signal is lost. The level of PGTHL may be set to 2.0 volts so that the second reference voltage is 2.0 or 1.85 volts depending on the level of R Light Load.

The output of the comparator PGcomp is coupled to the DC-to-DC converter 104 (FIG. 1) to selectively disable switching in the DC-to-DC converter 104 via the signal PGB (also shown in FIG. 1). More particularly, immediately upon start-up of the PFC stage, the level of $V_{FB}$ is low and begins to rise. While the level of $V_{FB}$ is below 2.3. volts, the level of PGB is a logic high voltage, which causes switching in the DC-to-DC converter to be disabled. Once the level of $V_{FB}$ the surpasses the level of the first reference voltage (e.g. 2.3 volts), this causes the level of PGB to change to a logic low voltage, which causes switching in the DC-to-DC converter to be enabled. Then, for the level of PGB to change again to a logic high voltage, the level of $V_{FB}$ needs to fall below the level of the second reference voltage. The level of the second reference voltage can be equal to 2.0 volts (PGTHL) or 1.85 volts (PGTHL—150 Mv), depending upon the level of R Light Load.

Thus, switching in the in the DC-to-DC converter is disabled under different different conditions, which conditions depend upon the state of the load at the time the line voltage was lost. More particularly, when the power converter 100 is operating under heavy loading conditions, the level of $V_{FB}$ is regulated to 2.5 volts and the second reference voltage at the comparator PGcomp is 2.0 volts. If the AC line voltage is then lost, the level of $V_{FB}$ will begin to fall; in this case, it will need to fall from 2.5 volts to 2.0 volts before the output of the comparator PGcomp causes the signal PGB to disable switching in the DC-to-DC converter 104. However, when the power converter 100 is operating under light load, the level of $V_{FB}$ is regulated to 2.25 volts and the second reference voltage at the comparator PGcomp can be 1.85 volts; if the AC line voltage is then lost, the level of $V_{FB}$ will begin to fall; in this case, it will need to fall from 2.25 volts to 1.85 volts before the output of the comparator PGcomp causes the signal PGB to disable switching in the DC-to-DC converter 104. In this way, the hold-up time for power loss under heavy loading conditions is controlled differently the hold-up time for power loss under light loading conditions. Because the hold-up times are controlled differently, differences in the way the power supply operates under light or heavy loads can be compensated so that the hold-up times are of a desired duration. In the embodiment of FIGS. 2 and 3, the disabling of the switching is performed such that the hold-up times are approximately the same for both light and heavy loads. This is because the time required for the level of $V_{FB}$ to fall from 2.5 volts to 2.0 volts under heavy loading conditions is expected to be approximately the same as the time required for the level of $V_{FB}$ to fall from 2.25 volts to 1.85 volts under light loading conditions. Alternatively, the disabling of the switching can be performed such that the hold-up times are different for light and heavy loads.

Figure 4:
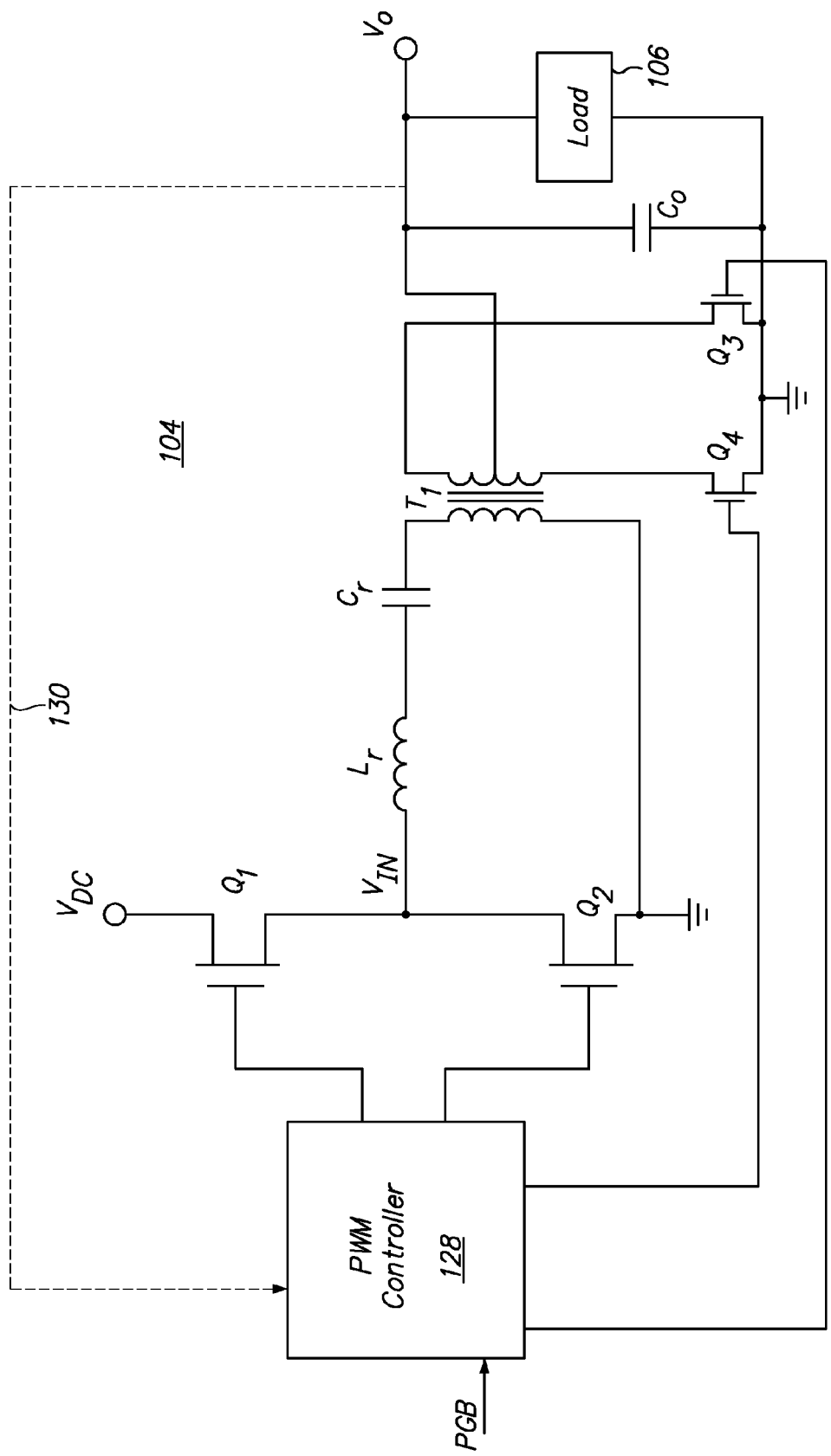
FIG. 4 illustrates a schematic diagram of a DC-to-DC converter in accordance with an embodiment of the present invention.

FIG. 4 illustrates a schematic diagram of a DC-to-DC converter 104 in accordance with an embodiment of the present invention. The DC-to-DC converter 104 may be, for example, a resonant switching converter. Referring to FIG. 4, the converter 104 includes a half-bridge switching inverter that includes a pair of series-connected transistor switches $Q_1$ and $Q_2$. A power source, such as the output $V_{DC}$ generated by the PFC stage 102 (FIG. 1), is coupled to a first terminal of the transistor switch $Q_1$. A second terminal of the transistor switch $Q_1$ is coupled to a first terminal of a transistor switch $Q_2$ to form an intermediate switch node. The second terminal of the transistor switch $Q_2$ is coupled to a ground node. A control terminal of each of the transistor switches $Q_1$ and $Q_2$ is coupled to a controller 128. The controller 128 controls opening and closing of the pair of transistor switches $Q_1$ and $Q_2$. When the switch $Q_1$ is closed and the switch $Q_2$ is open, the intermediate switch node is coupled to $V_{DC}$. This raises a voltage, $V_{IN}$, at the intermediate switch node. When the switch $Q_1$ is open and the switch $Q_2$ is closed, the intermediate node is coupled to ground. This lowers the voltage, $V_{IN}$, at the intermediate switch node. While FIG. 4 shows a half-bridge switching inverter, it can be replaced with a full-bridge switching inverter.

Energy storage elements are coupled to the intermediate switch node. Particularly, as shown in FIG. 4, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage $V_{IN}$ at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $Q_3$. A second terminal of the secondary winding of the transformer $T_1$ is coupled to a first terminal of a transistor switch $Q_4$. A second terminal of the transistor switch $Q_3$ and a second terminal of the transistor switch $Q_4$ are coupled to a ground node. A control terminal of each of the transistor switches $Q_3$ and $Q_4$ is coupled to the controller 128. The controller 128 controls opening and closing of the pair of transistor switches $Q_3$ and $Q_4$.

A center tap of the secondary winding of the transformer $T_1$ is coupled to a first terminal of a capacitor $C_O$. A second terminal of the capacitor $C_O$ is coupled to a ground node. An output voltage, $V_O$, is formed across the capacitor $C_O$. A load 106 may be coupled across the capacitor $C_O$ to receive the output voltage $V_O$. The output voltage $V_O$, or a voltage that is representative of the output voltage, is fed back to the controller 128 via a feedback path 130.

Adjusting the switching frequency of the transistor switches $Q_1$ and $Q_2$ adjusts impedance of the resonant tank and, therefore, adjusts the amount of power delivered to the load 106. More particularly, decreasing the switching frequency tends to increase the power delivered to the load 106. Increasing the switching frequency tends to reduce the power delivered to the load 106. By monitoring the level of the output voltage $V_O$ via a feedback path 130, the controller 128 can adjust the switching frequency to maintain the output voltage $V_O$ constant despite changes in the power requirements of the load 130 and despite changes in the level of the input $V_{DC}$. This is referred to as frequency modulation or FM modulation.

As power is transferred to the load 106 via the transformer $T_1$, current through the secondary winding of the transformer $T_1$ alternates in direction. The transistor switches $Q_3$ and $Q_4$ perform synchronous rectification. This is accomplished by the controller 128 turning the transistor switches $Q_3$ and $Q_4$ on and off at appropriate times so that the current through each of the switches $Q_3$ and $Q_4$ is in one direction only. Generally, the transistor switch $Q_3$ is on while the transistor switch $Q_4$ is off. Similarly, the transistor switch $Q_4$ is on while the transistor switch $Q_3$ is off. Synchronous rectification ensures that power is delivered to the load 130 and prevents reverse currents which could be reflected to the resonant tank.

As shown in FIG. 4, the power gating signal, PGB, is input to the controller 128. As explained previously, the signal, PGB, selectively causes switching in the DC-to-DC converter 104 to cease. Particularly, this signal halts switching of the transistor switches $Q_1$, $Q_2$, $Q_3$ and $Q_4$.

Figure 5:
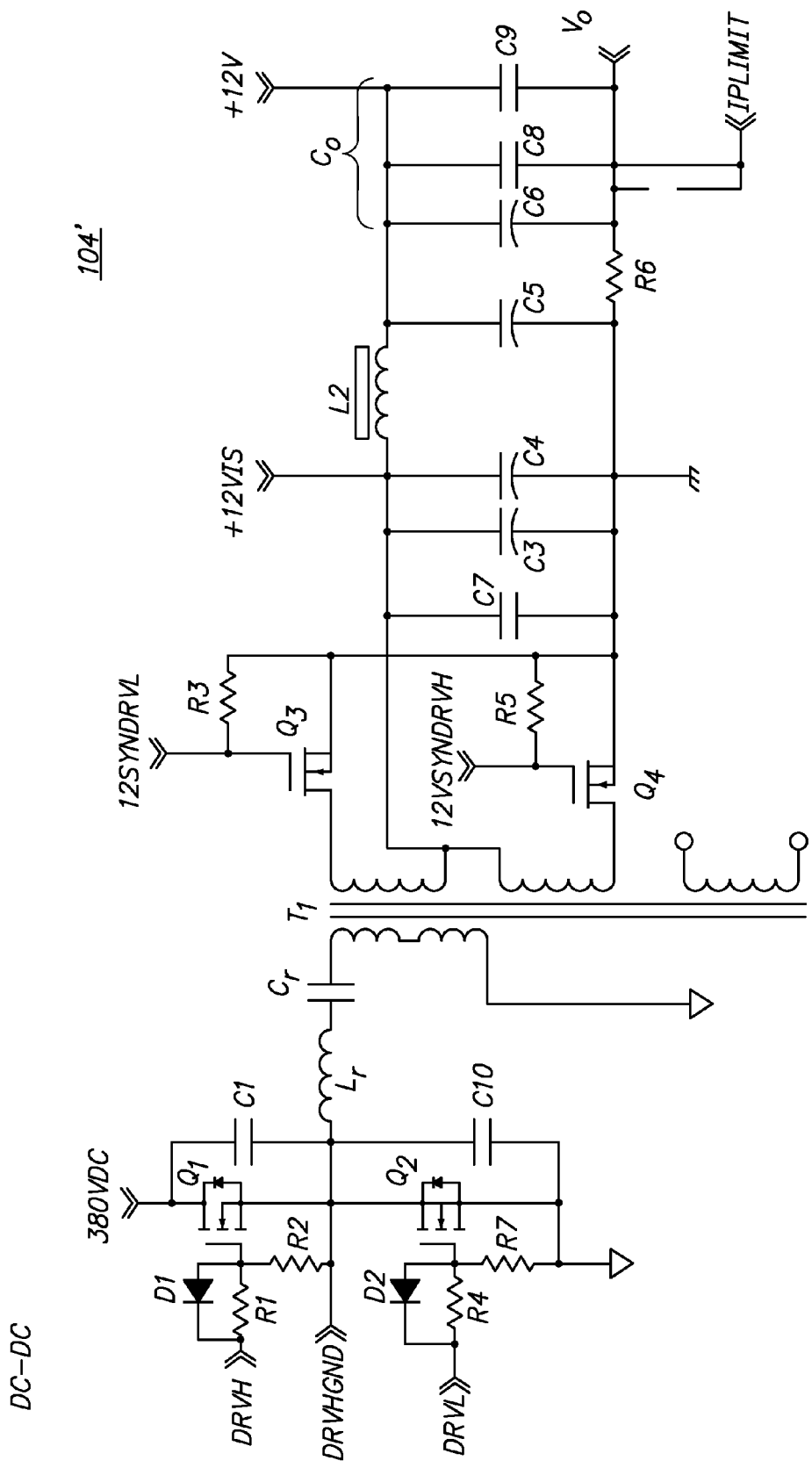
FIG. 5 illustrates a schematic diagram of a DC-to-DC converter in accordance with an embodiment of the present invention.

FIG. 5 illustrates a schematic diagram of a resonant switching converter 104' in accordance with an embodiment of the present invention. The switching converter 104' of FIG. 5 operates in essentially the same manner as the switching converter 104 illustrated in FIG. 4, though FIG. 5 shows additional details not shown in FIG. 4. Like reference numerals are used in FIG. 5 for elements having a functional correspondence with elements of FIG. 4. Thus, FIG. 5 shows that the transistor switches $Q_1$ and $Q_2$ form the half-bridge inverter. In addition, inductor $L_r$ and capacitor $C_r$ form the resonant tank. The half-bridge inverter is coupled to the resonant tank which is, in turn, coupled to the primary side of the transformer $T_1$. Switches $Q_3$ and $Q_4$ are coupled to the secondary side of the transformer $T_1$ and perform synchronous rectification. The regulated output voltage $V_O$ is formed across capacitor Co. As shown in FIG. 4, the capacitor Co comprises capacitors $C_6$, $C_8$ and $C_9$. It will be apparent that the switching converter 104' of FIG. 5 is exemplary and that alterations can be made. For example, a different resonant tank configuration, such as a parallel resonant tank, may be employed. Also, rather, than a half-bridge inverter, a full-bridge inverter may be employed.

Figure 6:
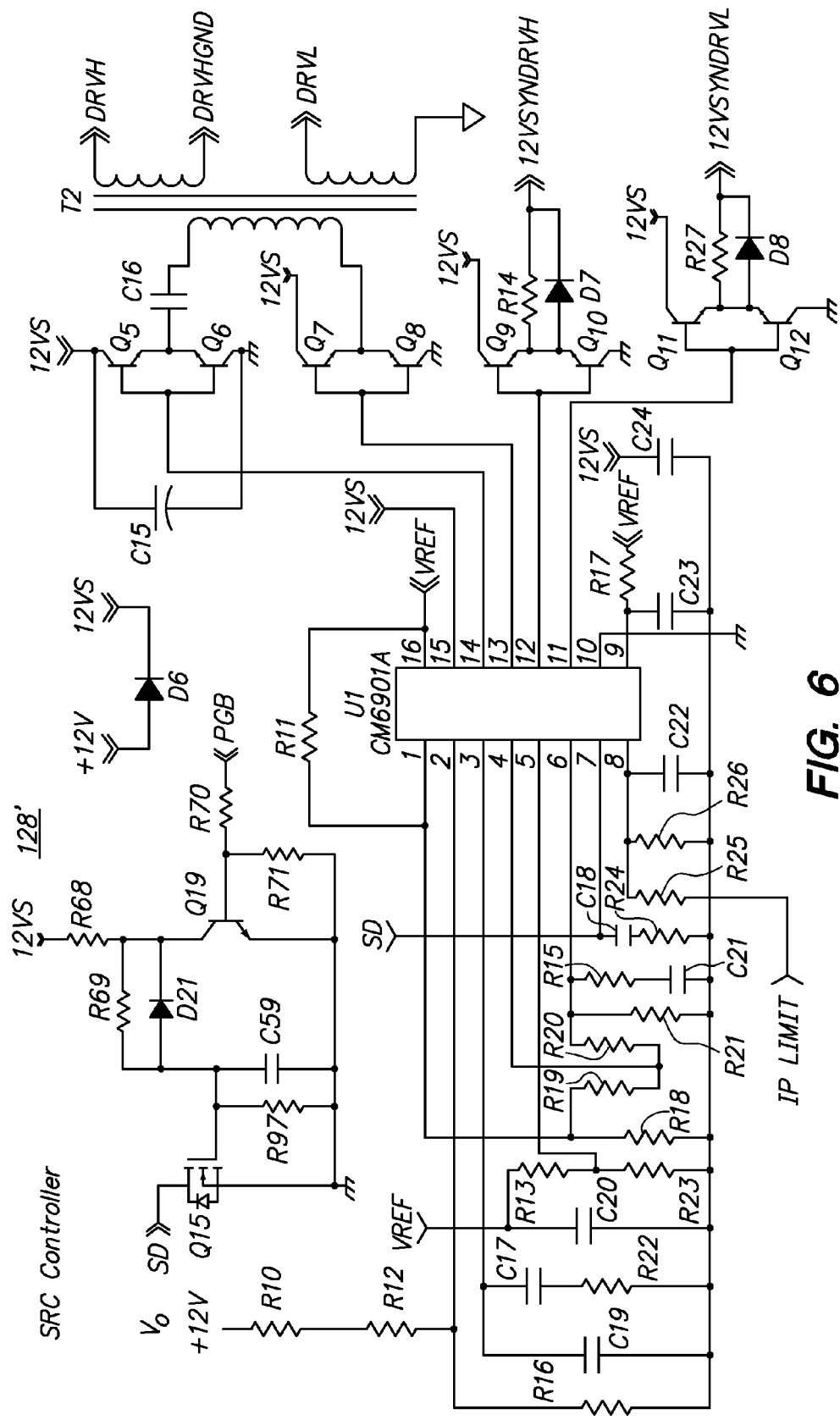
FIG. 6 illustrates a block schematic diagram of a controller for a DC-to-DC converter in accordance with an embodiment of the present invention.

FIG. 6 illustrates a block schematic diagram of a controller 128' for a resonant switching converter in accordance with an embodiment of the present invention. The controller 128' of FIG. 6 operates as described above in connection with the controller 128 shown in FIG. 4 to control the transistor switches $Q_1$, $Q_2$, $Q_3$ and $Q_4$. More particularly, as shown in FIGS. 5 and 6, a signal DRVH is generated by the controller 128' and used to drive the transistor switch $Q_1$. Similarly, a signal DRVL is generated by the controller 108' and used to drive the transistor switch $Q_2$. A signal 12VSYNDRVL is generated by the controller 108' and used to drive the transistor switch $Q_3$. In addition, a signal 12VSYNDRVH is generated by the controller 128' and used to drive the transistor switch $Q_4$. As shown in FIG. 6, transistors $Q_5$, $Q_6$, $Q_7$ and $Q_8$, along with a transformer $T_2$ generate drive signals for the transistor switches $Q_1$ and $Q_2$. Transistors $Q_9$, $Q_{10}$, $Q_{11}$ and $Q_{12}$ generate drive signals for the transistor switches $Q_1$ and $Q_2$.

Figure 7:
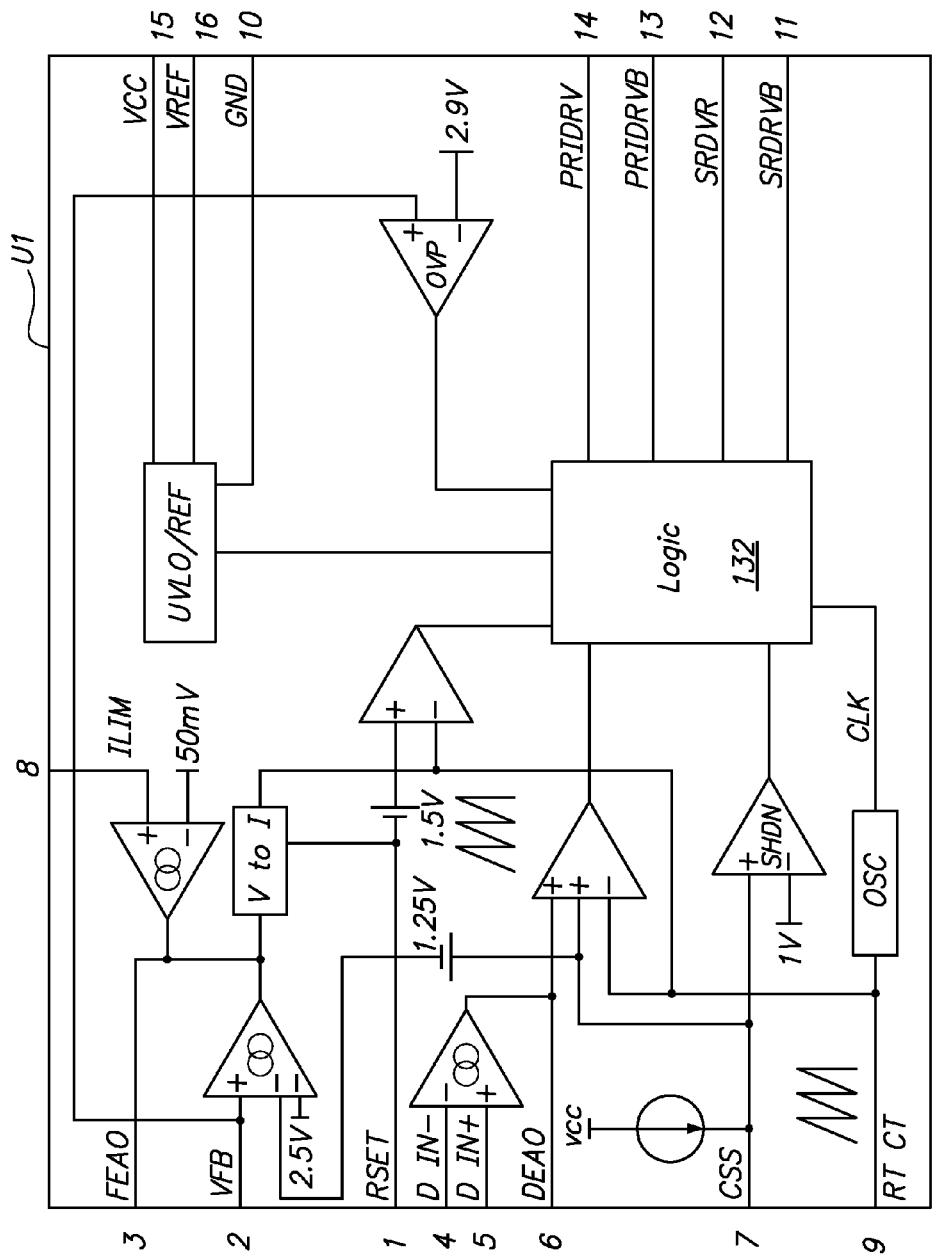
FIG. 7 illustrates a block schematic diagram of a controller integrated circuit for a DC-to-DC converter in accordance with an embodiment of the present invention.

FIG. 7 illustrates a block schematic diagram of the controller integrated circuit $U_1$ for the resonant switching converter 104' and controller 128' in accordance with an embodiment of the present invention. The integrated circuit $U_1$ may be obtained under part number CM6901A through Champion Microelectronic Corporation, whose address is 5F, No. 11, Park Ave. II, Hsinchu Science-Based Industrial Park, Hsinchu City, Taiwan. Operation of the resonant switching converter is described in U.S. patent application Ser. No. 12/290,853, filed Nov. 4, 2008, the entire contents of which are hereby incorporated by reference.

As shown in FIG. 6, the power gating signal, PGB, is input to the controller 128. In a preferred embodiment, optical isolation is employed for the PGB signal between the PFC stage 102 and the DC-to-DC converter stage 104'. As explained previously, the signal, PGB, selectively causes switching in the DC-to-DC converter 104' to cease. Particularly, as shown in FIG. 6, this signal activates a shut down signal, SD. The shut down signal SD is applied to a CSS pin of the integrated circuit controller U1. And, as shown in FIG. 7, the CSS pin of integrated circuit controller U1 is coupled to shutdown comparator SHDN. The output of the shutdown comparator is coupled to logic block 132. Activation of the shutdown comparator by the shutdown signal halts switching of the transistor switches $Q_1$, $Q_2$, $Q_3$ and $Q_4$.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
 one or more power supply stages that receive power from an input power source and that generate a regulated output voltage for powering a load by alternately opening and closing a set of switches; and
 controller circuitry that monitors the input power source for loss of power and that monitors a state of the load, and when loss of power is detected, the controller circuitry saves a state of the load, wherein the state of the load represents a level of power drawn by the load.

2. The switching power supply according to claim 1, wherein said alternately opening and closing a set of switches is disabled in response said loss of power being detected.

3. The switching power supply according to claim 2, wherein the controller circuitry uses the saved state of the load for generating a signal that disables said alternately opening and closing a set of switches.

4. The switching power supply according to claim 3, wherein said alternately opening and closing a set of switches is disabled under different conditions, which conditions depend upon the state of the load at the time the line voltage was lost.

5. The switching power supply according to claim 1, wherein said alternately opening and closing the set of switches is disabled a period of time after the line voltage is lost wherein the period of time is different depending upon the state of the load at the time the line voltage was lost.

6. The switching power supply according to claim 5, wherein the state of the load is heavy or light.

7. The switching power supply according to claim 1, wherein the one or more power supply stages include a first power supply stage that receives a line voltage from an input power source and that generates an intermediate voltage; and a second power supply stage that receives the intermediate voltage and generates the regulated output voltage.

8. The switching power supply according to claim 7, wherein the first power supply stage performs power factor correction.

9. The switching power supply according to claim 7, wherein the intermediate voltage is regulated at a first voltage level when the state of the load is heavy and at a second voltage level, lower than the first, when the state of the load is light.

10. The switching power supply according to claim 7, wherein the state of the load is determined by comparing an error voltage to a predetermined threshold.

11. The switching power supply according to claim 10, wherein the error voltage is representative of a difference between the level of the intermediate voltage and a desired level for the intermediate voltage.

12. The switching power supply according to claim 11, wherein a comparator performs said comparing using hysteresis.

13. The switching power supply according to claim 1, wherein the input power source is monitored for loss of power by monitoring a level of an input current received from the input power source by the one or more power supply stages.

14. The switching power supply according to claim 13, wherein the loss of power is detected when the level of the input current falls below a predetermined threshold.

15. A method of operating a switching power supply comprising: receiving power from an input power source and generating a regulated output voltage for powering a load by alternately opening and closing a set of switches; monitoring the input power source for loss of power; monitoring a state of the load; and saving the state of the load upon detection of loss of power by said monitoring the input power source, wherein the state of the load represents a level of power drawn by the load.

16. The method of operating a switching power supply according to claim 15, wherein said alternately opening and closing a set of switches is disabled in response said loss of power being detected.

17. The method of operating a switching power supply according to claim 16, further comprising using the saved state of the load for generating a signal that disables said alternately opening and closing a set of switches.

18. The method of operating a switching power supply according to claim 17, wherein said alternately opening and closing a set of switches is disabled under different conditions, which conditions depend upon the state of the load at the time the line voltage was lost.

19. The method of operating a switching power supply according to claim 15, wherein said alternately opening and closing the set of switches is disabled a period of time after the line voltage is lost wherein the period of time is different depending upon the state of the load at the time the line voltage was lost.

20. The method of operating a switching power supply according to claim 15, wherein the one or more power supply stages include a first power supply stage that receives a line voltage from an input power source and that generates an intermediate voltage; and a second power supply stage that receives the intermediate voltage and generates the regulated output voltage.

21. The method of operating a switching power supply according to claim 20, wherein the intermediate voltage is regulated at a first voltage level when the state of the load is heavy and at a second voltage level, lower than the first, when the state of the load is light.

22. A switching power supply comprising:
one or more power supply stages that receive power from an input power source and that generate a regulated output voltage for powering a load by alternately opening and closing a set of switches; and
controller circuitry that monitors the input power source for loss of power and that monitors a level of power drawn by the load, and when loss of power is detected, the controller circuitry disables said alternately opening and closing the set of switches a period of time after the line voltage is lost wherein the period of time is different depending upon the state of the load at the time the line voltage was lost.

23. The switching power supply according to claim 22, wherein the one or more power supply stages include a first power supply stage that receives a line voltage from an input power source and that performs power factor correction to generate an intermediate voltage and a second power supply stage that receives the intermediate voltage and generates the regulated output voltage.

24. The switching power supply according to claim 23, wherein the intermediate voltage is regulated at a first voltage level when the state of the load is heavy and at a second voltage level, lower than the first, when the state of the load is light.

25. The switching power supply according to claim 24, wherein the state of the load is determined by comparing an error voltage to a predetermined threshold.

26. The switching power supply according to claim 25, wherein the error voltage is representative of a difference between the level of the intermediate voltage and a desired level for the intermediate voltage.

27. The switching power supply according to claim 26, wherein a comparator performs said comparing using hysteresis.

* * * * *